United States Patent
Busch et al.

(10) Patent No.: US 11,225,269 B2
(45) Date of Patent: Jan. 18, 2022

(54) USE OF A MULTI-LAYERED SHEET MATERIAL COMPRISING AT LEAST ONE TEXTILE FABRIC, CROSSWAY ELEMENT COMPRISING SUCH A MULTI-LAYERED SHEET MATERIAL, AND VEHICLE, AIR PASSENGER BRIDGE OR STAIRCASE COMPRISING SUCH A CROSSWAY ELEMENT

(71) Applicant: Hübner GmbH & Co. KG, Kassel (DE)

(72) Inventors: Thomas Busch, Reinhardshagen (DE); Andreas Wiegrefe, Fulda (DE); Uwe Werner, Lauchhammer (DE); Stefan Hanisch, Cottbus (DE)

(73) Assignee: Hübner GmbH & Co. KG, Kassel (DE)

( * ) Notice: Subject to any disclaimer, the term of this patent is extended or adjusted under 35 U.S.C. 154(b) by 572 days.

(21) Appl. No.: 16/302,361

(22) PCT Filed: May 16, 2017

(86) PCT No.: PCT/EP2017/061776
§ 371 (c)(1),
(2) Date: Nov. 16, 2018

(87) PCT Pub. No.: WO2017/198683
PCT Pub. Date: Nov. 23, 2017

(65) Prior Publication Data
US 2019/0185027 A1    Jun. 20, 2019

(30) Foreign Application Priority Data

May 17, 2016    (DE) ..................... 10 2016 109 070.0

(51) Int. Cl.
*B61D 17/22* (2006.01)
*B60D 5/00* (2006.01)
(Continued)

(52) U.S. Cl.
CPC .............. *B61D 17/22* (2013.01); *B60D 5/003* (2013.01); *B32B 5/024* (2013.01); *B32B 5/10* (2013.01);
(Continued)

(58) Field of Classification Search
CPC ........ B61D 17/22; B60D 5/003; B32B 5/024; B32B 5/10; B32B 2255/26; B32B 2605/00
See application file for complete search history.

(56) References Cited

U.S. PATENT DOCUMENTS

| | | | | |
|---|---|---|---|---|
| 291,938 A | * | 1/1884 | Rice | ........................... B21C 9/02 |
| | | | | 508/154 |
| 3,047,026 A | * | 7/1962 | Kahn | ..................... F16L 11/112 |
| | | | | 138/122 |

(Continued)

FOREIGN PATENT DOCUMENTS

| | | |
|---|---|---|
| AU | 2007216868 A1 | 4/2008 |
| DE | 593 970 C | 3/1934 |

(Continued)

OTHER PUBLICATIONS

European Search Report of DE 10 2016 109 070.0, dated Mar. 2, 2017.

(Continued)

*Primary Examiner* — Jason C Smith
(74) *Attorney, Agent, or Firm* — Dickinson Wright PLLC (57) ABSTRACT

The present invention relates to the use of a multi-layered sheet material (1) comprising a reinforcing member (2), having a polymer coating (3) at least on one side, preferably (Continued)

on both sides, wherein the reinforcing member (2) comprises at least one backing fabric (6) made of warp threads (7*a,b*) and weft threads (8*a,b*), and wherein the sheet material (1) comprises at least one channel (12) extending through the sheet material (1), and wherein the warp and weft threads (7*a,b*; 8*a*; 8*b*) are woven together such that the backing fabric (6) comprises both single layer fabric regions (14) and at least one at least two-layered fabric region having at least two fabric layers (15*a,b*), which are not joined together, so that the channel (12) is each formed between the fabric layers (15*a,b*), as a bellows wall (19) of a crossway bellows (16), a crossway element comprising such a sheet material for the protection of a passageway of two vehicle parts or components, which are connected together movably relative to each other, against external influences, as well as a vehicle, a flight passenger bridge or staircase and a building connection comprising such a crossway element.

17 Claims, 4 Drawing Sheets (51) Int. Cl.
  *B32B 5/02* (2006.01)
  *B32B 5/10* (2006.01)
(52) U.S. Cl.
  CPC ....... *B32B 2255/26* (2013.01); *B32B 2605/00* (2013.01)

(56) References Cited

U.S. PATENT DOCUMENTS

| | | | | |
|---|---|---|---|---|
| 4,196,755 A * | 4/1980 | Kutnyak | ............... | B29C 53/785 138/122 |
| 4,570,964 A * | 2/1986 | Tatay | ............... | B60D 5/003 280/403 |
| 4,905,607 A * | 3/1990 | Wanneroy | ............... | B61D 17/22 105/8.1 |
| 5,385,174 A * | 1/1995 | Kanao | ............... | F16L 11/112 138/122 |
| 5,526,849 A * | 6/1996 | Gray | ............... | F16L 11/081 138/133 |
| 5,546,866 A * | 8/1996 | Koch | ............... | B60D 5/003 105/18 |
| 6,158,477 A * | 12/2000 | Waters | ............... | F16L 11/088 138/125 |
| 6,186,183 B1 * | 2/2001 | Lepoutre | ............... | F16L 11/24 138/125 |
| 6,827,109 B2 * | 12/2004 | McCaughtry | ............... | F16L 11/112 138/122 |
| 7,476,427 B2 * | 1/2009 | Ruid | ............... | B32B 17/02 428/35.7 |
| 7,766,050 B2 * | 8/2010 | Patel | ............... | B29C 65/5057 138/129 |
| 8,833,264 B2 | 9/2014 | Maerten | | |
| 8,869,706 B2 * | 10/2014 | Koukal | ............... | B61D 17/22 105/18 |
| 2012/0009835 A1 * | 1/2012 | Hubner | ............... | D06N 3/128 442/1 |
| 2014/0291938 A1 * | 10/2014 | Koukal | ............... | B60D 5/006 277/345 |
| 2017/0247119 A1 * | 8/2017 | Busch | ............... | B60D 5/003 |
| 2019/0185027 A1 * | 6/2019 | Busch | ............... | B61D 17/22 |
| 2020/0023699 A1 * | 1/2020 | Busch | ............... | B60D 5/006 |
| 2020/0232126 A1 * | 7/2020 | Wiegrefe | ............... | D03D 11/02 |

FOREIGN PATENT DOCUMENTS

| | | |
|---|---|---|
| DE | 3035159 A1 | 4/1982 |
| DE | 4007862 A1 | 9/1990 |
| DE | 4419410 A1 | 12/1995 |
| DE | 102011107370 A1 | 1/2013 |
| EP | 0 297 936 A1 | 1/1989 |
| EP | 0698514 A1 | 2/1996 |
| EP | 2 091 766 B1 | 8/2009 |
| WO | WO 2013/023634 A1 | 2/2013 |

OTHER PUBLICATIONS

International Search Report of PCT/EP2017/061776 dated Sep. 6, 2017.

\* cited by examiner

USE OF A MULTI-LAYERED SHEET MATERIAL COMPRISING AT LEAST ONE TEXTILE FABRIC, CROSSWAY ELEMENT COMPRISING SUCH A MULTI-LAYERED SHEET MATERIAL, AND VEHICLE, AIR PASSENGER BRIDGE OR STAIRCASE COMPRISING SUCH A CROSSWAY ELEMENT

CROSS-REFERENCE TO RELATED APPLICATIONS

This application is a 35 U.S.C. § 371 national phase application of PCT International Application No. PCT/EP2017/061776, filed May 16, 2017, which claims the benefit of priority under 35 U.S.C. § 119 to German Patent Application No. 10 2016 109 070.0, filed May 17, 2016, the contents of which are incorporated herein by reference in their entirety.

FIELD OF THE INVENTION

The present invention relates to the use of a multi-layered sheet material comprising a reinforcing member having a polymer coating at least on one side, preferably on both sides, wherein the reinforcing member comprises at least one textile fabric as bellows wall of a crossway bellows, in particular of a crossway bellows in the form of a corrugated or pleated bellows.

The invention further relates to a crossway element, in particular a crossway bellows, for components, vehicles, building connections or for flight passenger bridges or staircases, comprising at least one such multi-layered sheet material, wherein the crossway element serves to protect a passageway of two vehicle parts or components, which are movably connected to each other, or of two building parts, in particular of two vehicle parts or components being interconnected in an articulated manner, from external influences.

In addition, the invention relates to a vehicle, a building connection and a flight passenger bridge or staircase with such a crossway element, in particular a crossway bellows.

BACKGROUND

It is known to use crossway bellows in the form of pleated or corrugated bellows as crossway protection for the passage between the individual, mutually articulated and connected vehicle parts of a vehicle, in particular of an articulated bus or of a rail vehicle, or as crossway protection for flight passenger bridges. The pleats or corrugations provide for the necessary extensibility in the drive direction so that relative movements of the vehicle parts or of the flight passenger bridge members are possible. The pleated or corrugated bellows comprise a bellows wall made of a multi-layered sheet material with a central reinforcing member, wherein the bellows wall is fixed into bellows frames at regular intervals to form the corrugations or pleats. For this purpose, the bellows frames are formed to be U-shaped in cross section, wherein the bellows wall is clamped into the opening of the bellows frame. This kind of pleated bellows is known, for example, from EP 0 698 514 B1. Clamping of the bellows wall is complicated.

WO 2013/023634 A1 discloses a corrugated bellows in which the bellows wall consists of two reinforcing members which are connected together in such a manner that guides are formed in the shape of loops. The loops serve to accommodate the bellows frame and thus simplify the assembly. The reinforcing members are connected together by sewing, knitting, wrapping, welding or gluing.

And from EP 2 091 766 B1 a pleated bellows is known whose bellows wall consists of a textile top side and a textile under side which are joined together with pile thread. For example, this can be a composite fabric made of two woven fabrics (two-ply fabric) joined together by the pile threads. The pile threads keep the upper side and under side apart and in the axial direction of the bellows, they have a distance to each other so that lanes or channels form. The support frames of the bellows are passed through the lanes or channels.

The known corrugated and pleated bellows have proven their worth.

The object of the present invention is to provide a multi-layered sheet material for use as bellows wall of a generic crossway bellows, which comprises a reinforcing member having a polymer coating at least on one side, preferably on both sides, and having channels for the mounting of the frame elements, wherein the course and the shape of the channels can be set freely and the sheet material is simple and low in cost to produce and has a low weight.

An additional object of the present invention is to provide a crossway element, in particular a crossway bellows, for protecting a crossway of two components or vehicle parts which are connected together movably relative to each other, in particular of two vehicle parts or components being interconnected in an articulated manner, against external influences, wherein the crossway element comprises at least two tensioning elements being spaced apart from each other and having stretched a sheet material as crossway member wall in between.

An additional object is to provide a vehicle or a flight passenger bridge or staircase with such a crossway element.

The objects are solved by a use of a multi-layered sheet material, a crossway element, a vehicle, a flight passenger bridge or staircase, and a building connection with the features described herein.

The invention will be explained in greater detail below, based on the figures.

The figures show.

DETAILED DESCRIPTION

The multi-layered flexible sheet material 1 used according to the invention (FIGS. 1 and 2) comprises a central, plane reinforcing member layer or rather a central, plane reinforcing member 2, which has an outer or external polymer coating 3 on both sides. The polymer coating 3 respectively forms the outer side of the multi-layered sheet material 1.

Figure 1:
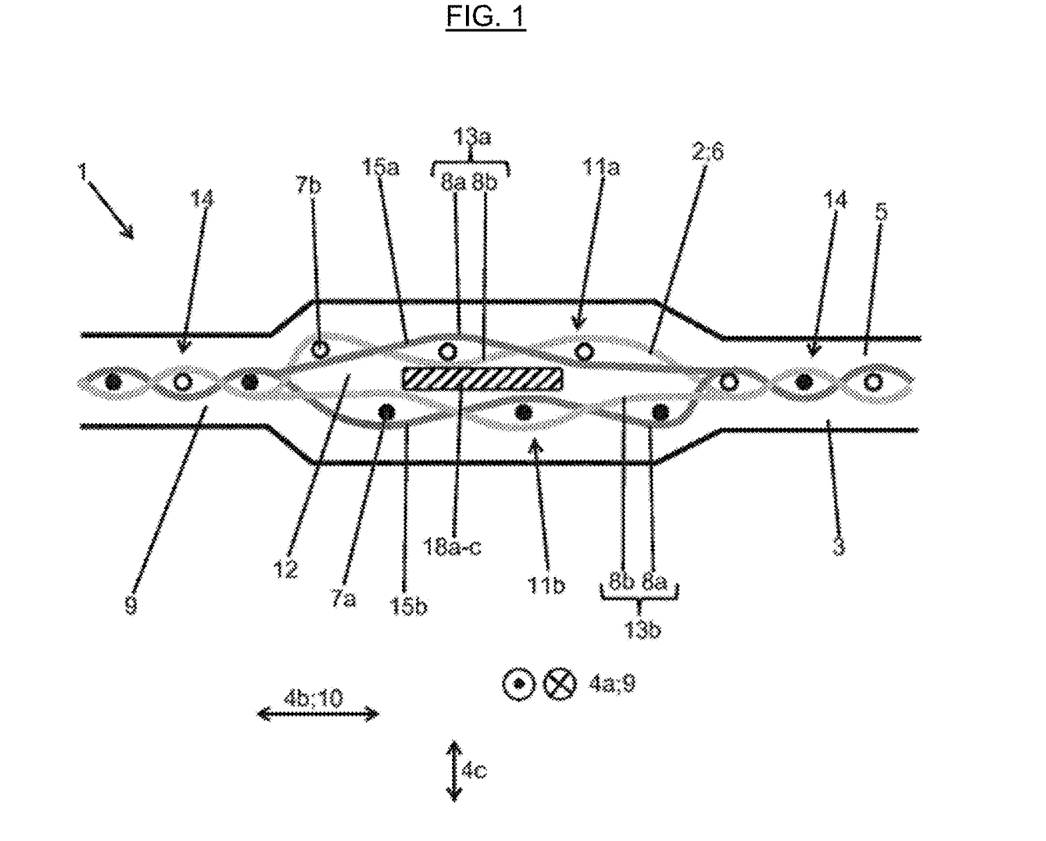
FIG. 1 is a simplified and highly schematic cross-sectional view of a sheet material used according to the invention.
Figure 2:
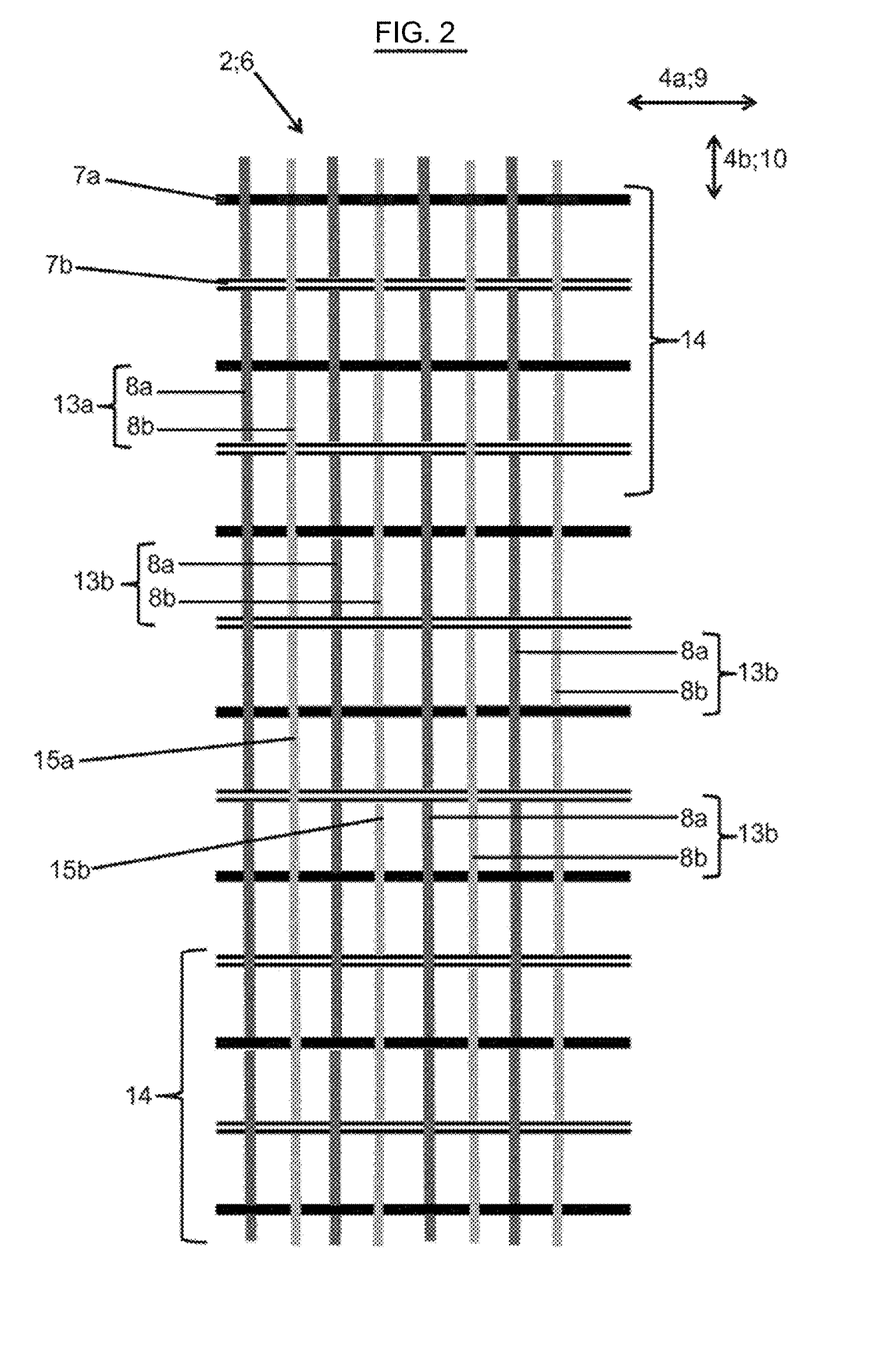
FIG. 2 is a top view schematic of a backing fabric of the sheet material used according to the invention.

In addition, the multi-layered sheet material 1 comprises a first spatial direction or rather surface direction 4a, as well as a second spatial direction or rather surface direction 4b perpendicular thereto. Or rather, the multi-layered sheet material 1 has an area-measured extension into the first and second surface direction 4a;b. In addition, the sheet material 1 comprises a thickness direction or rather a height direction 4c, which is perpendicular to the two surface directions 4a;b. The plane reinforcing member 2 consequently likewise has an area-measured extension in the first and second surface direction 4a;4b as well as a height or thickness extension in the thickness direction 4c.

The polymer coating 3 consists of a polymer matrix 5, into which preferably fillers, in particular flame-retardant fillers, are embedded. The polymer matrix 5 consists in particular of a polymer material or rather polymer according to DIN 7724-1993-04. Preferably, the polymer matrix 5 consists of an elastomer according to DIN 7724-1993-04. Accordingly, elastomers are shape-keeping, but elastically deformable polymers whose glass transition point is below the working temperature. The elastomers can be elastically deformed on tensile and pressure load, but thereafter return to their original, not deformed shape. The polymer matrix 5 preferably consists of vulcanized rubber, in particular of vulcanized silicone rubber or vulcanized natural rubber, or of CSM (chlorosulfonated polyethylene) or EPDM (ethylene-propylene-diene rubber) or EVA (ethylene vinyl acetate) or PVC (polyvinyl chloride) or of PU (polyurethane) or mixtures thereof.

According to the invention, the reinforcing member 2 comprises a backing fabric 6. The backing fabric 6 in the known manner comprises warp threads 7a;b extending in the first surface direction 4a, and weft threads 8a;b intersecting the warp threads 7a;b and extending parallel to the second surface direction 4b. The first surface direction 4a thus corresponds to a warp direction 9 and the second surface direction 4b thus corresponds to a weft direction 10 of the backing fabric 8. In addition, the backing fabric 6 comprises a fabric top side 11a and a fabric bottom side 11b.

The warp and weft threads 7a,b; 8a,8b each concern monofilament threads or multifilament threads. Monofilament threads each consist of a single monofilament. Multifilament threads consist of several monofilaments. The monofilaments can each be formed as a single piece (monolithic) or comprise a core/shell structure. In this regard, a multifilament thread can comprise different monofilaments, for example, of different materials.

According to the invention, the backing fabric 6 is formed such that it comprises at least one channel or rather a lane or rather a passage 12, which extends perpendicular to the height direction 4c or rather in at least one of the two surface directions 4a;b through the backing fabric 6. Preferably, the backing fabric 6 comprises several channels 12. The channels 12 comprise at least one, preferably two, channel ends by which they each open to the environment.

The channels 12 are produced by correspondingly binding or rather weaving the warp and/or weft threads 7a,b; 8a,8b.

According to a preferred embodiment of the invention (FIGS. 1 and 2) the backing fabric 6 comprises first and second warp threads 7a;b and first and second weft threads 8a;b. The first and second warp threads 7a;b are arranged alternately in the weft direction 10. And the first and second weft threads 8a;b are arranged alternately in the warp direction 9. In addition, the backing fabric 6 comprises a plurality of first and second weft threads pairs 13a;b, which likewise are arranged alternately in the warp direction 9. In this regard, each weft thread pair 13a;b comprises a first and a second weft thread 8a;b.

Now the backing fabric 6 comprises the channels 12 on the one hand and channel-free fabric areas 14 on the other hand. In the channel-free fabric areas 14, the backing fabric 6 is formed single layer and preferably has a linen weave. That is, the first weft threads 8a pass over the first warp threads 7a and under the second warp threads 7b, and the second weft threads 8b each pass over the second warp threads 7b and under the first warp threads 7a. Both, the first and the second weft threads 8a;8b are thus each woven with the first and second warp threads 7a;b, that is, they are woven with all warp threads 7a;7b.

However, in the region of the channels 12, the first and second weft thread pairs 13a;b are divided as described as follows.

The first weft thread pairs 13a are bonded only with the first warp threads 7a and the second weft thread pairs 13b are bonded only with the second warp threads 7b. Or rather, the first weft thread pairs 13a are woven only with the first warp threads 7a and the second weft thread pairs 13b are woven only with the second warp threads 7b. The first weft thread pairs 13a and the first warp threads 7a are likewise preferably bonded by means of a linen weave. The same applies to the second weft thread pairs 13b and the second warp threads 7b. Thus, the first and second weft thread pairs 13a;b are each woven only with every second warp thread 7a;b.

Thus, the first weft thread pairs 13a with the first warp threads 7a form a first, in particular upper, fabric layer 15a, and the second weft thread pairs 13b with the second warp threads 7b form a second, in particular lower, fabric layer 15b. The two fabric layers 15a;b are not bonded together, so that the inventive channels 12 are formed between the two fabric layers 15a;b. In addition, the two fabric layers 15a;b are arranged adjacent or rather aligned to each other in height direction 4c.

In addition, it is advantageous for the use according to the invention as the sheet material 1 is formed to be elastically. Preferably, the sheet material 1 has a maximum elongation or rather maximum tensile elongation $\varepsilon_H$ according to DIN EN ISO 13934-1:2013 of ≥100%, preferably of 100 to 500%, in the first surface direction 4a and/or in the second surface direction 4b.

Figure 3:
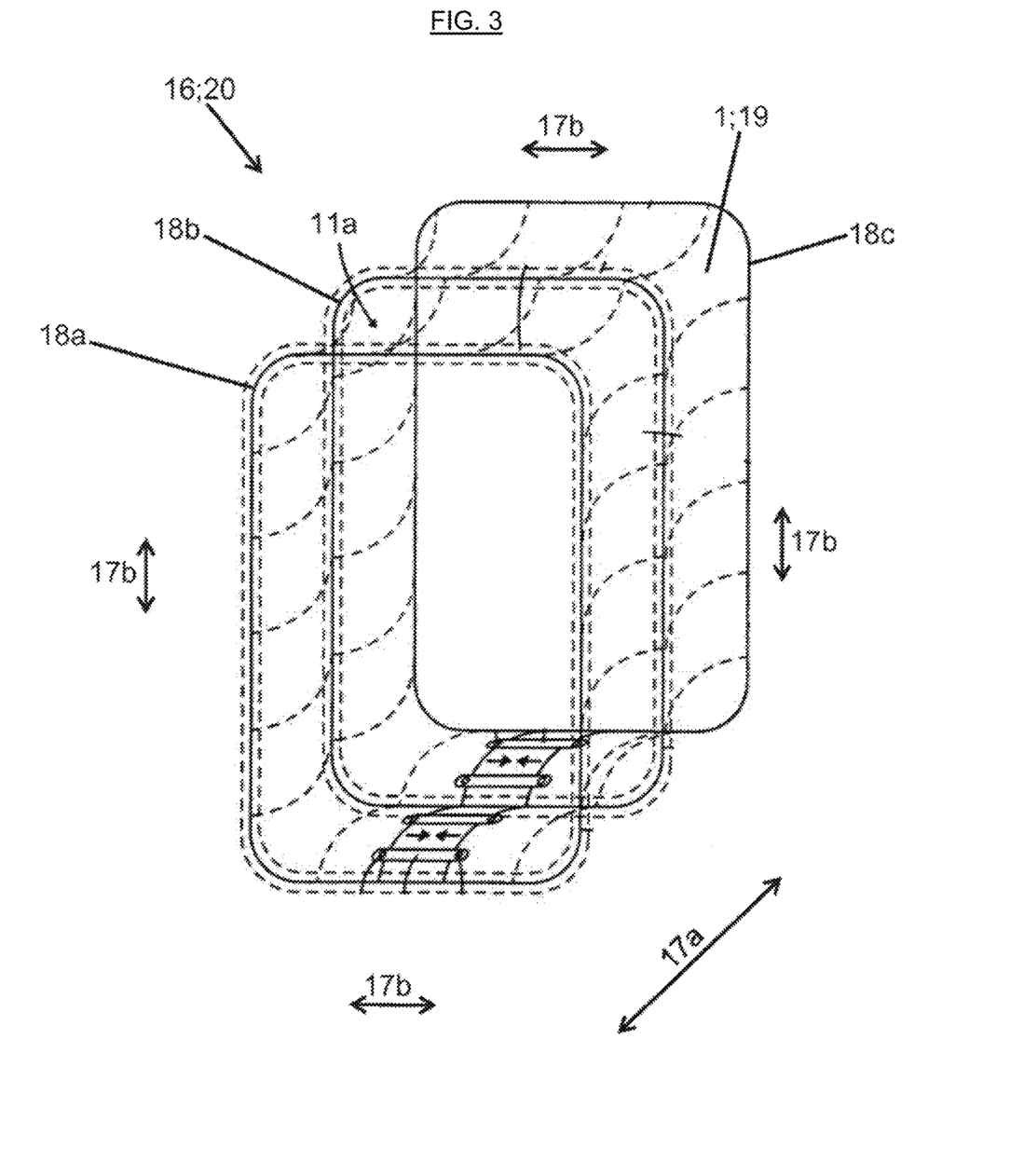
FIG. 3 is a schematic, perspective view of a corrugated bellows.
Figure 4:
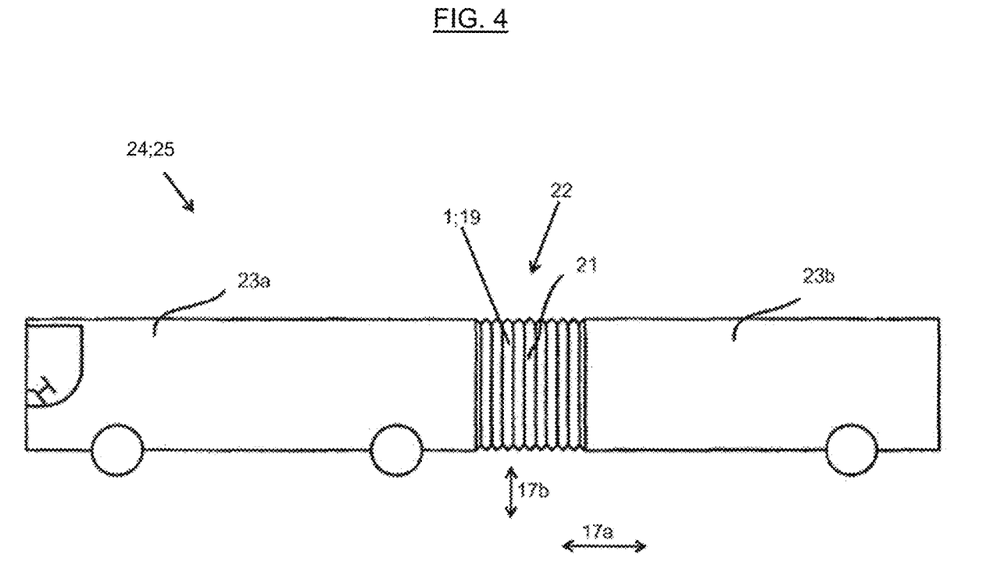
FIG. 4 is a schematic, side view of a crossway of two vehicle parts with a crossway bellows in the form of a pleated bellows.

As already explained, according to the invention the sheet material 1 is used for a crossway bellows 16 (FIGS. 3 and 4). The crossway bellows 16 comprises a bellows longitudinal direction 17a and a bellows circumferencial direction 17b perpendicular thereto. In addition, the crossway bellows 16 comprises a plurality of bellows supporting frames 18a-c running around the circumference and arranged at a distance from each other in the bellows longitudinal direction 17a, as well as a bellows wall 19 tensioned between the bellows supporting frames 18a-c. The bellows wall 19 surrounds a tunnel-like or rather channel-like bellows interior space.

The crossway bellows 16 preferably concerns a corrugated bellows 20 (FIG. 3) or to a pleated bellows 21 (FIG. 4). In the case of the corrugated bellows 20, the bellows wall 19 is tensioned in a known manner such that the bellows wall 19 in the non-stressed state or rather in the not extended state of the corrugated bellows, sags between the bellows frames 18a-c and thus corrugations are formed between the bellows frames 18a-c. In a known manner, the pleated bellows 21 comprises alternating inner and outer pleat edges, wherein the bellows wall 19 is tensioned at the pleat edges each in a bellows frame 18a-c.

According to the invention, the bellows wall 19 as invented, consists of the sheet material 1, and the channels 12 are used according to the invention to accommodate the bellows frames 18a-c. That is, the bellows frames 18a-c are arranged in the channels 12. Or rather, one bellows frame 18a-c each passes through one channel 12. Thus, the bellows wall 19 is tensioned onto the bellows frames 18a-c or rather is tensioned between them. For this purpose, the channels 12 extend, for example, in the bellows circumferencial direction 17b. This means that no individual material sections need to be produced in the form of pleats or corrugations and then connected by means of bellows frames. The bellows wall 19 of a crossway bellows can consist of a single material section, for example, wherein the bellows tensioning frames 18a-c are pulled into the channels 12. In the case of the pleated bellows 21, for example, one bellows frame 18a-c is present at each pleated edge.

The channels 12 herein simplify the assembly of the crossway bellows 16 considerably, since the bellows frames 18a-c merely have to be passed through the channels 12. A complicated clamping of the bellows wall 19 is not required. In addition, the bellows wall 19 can consist of one piece or at least of a plurality of longer sections, and not of numerous, individual material strips, as is the case for the known corrugated and pleated bellows. Because in the case of known corrugated bellows, generally one material strip is provided per corrugation, and in the case of known pleated bellows, one material strip extends from each pleated edge to pleated edge.

Further advantage of the material sheet 1 used according to the invention is that it concerns a low-cost, light-weight material. Because the single-layer backing fabric 6 according to the invention is significantly lighter than the known, double-layer composite fabric or the material sheet consisting of two mutually glued or welded textile layers. In addition, the backing fabric 6 according to the invention is easier to produce. This is because the channels 12 are produced directly during the weaving by means of corresponding lifting or lowering of the individual warp threads 7a;b.

Furthermore, the course and the shape of the channels 12 can be selected as needed. In particular, the channels 12 need not extend through the backing fabric 6 parallel to the warp direction 9, but rather they can also extend at a slant or perpendicularly thereto, that is, parallel to the weft direction 10. The channels 12 can also extend in a curve shape or in a bow shape. In addition, the width of the channels 12 can be different, or can be varied across their length. This is because such a backing fabric 6 can be produced very easily and without any problems, and also with significant variation due to controlled lifting and lowering of the warp threads 7a;b.

In particular, the channels 12 thus extend, at least in regions, as not parallel to the warp direction 9 of the backing fabric 6.

In addition, it is possible that the two channel longitudinal edges delimiting the channels 12 on the side are not parallel to each other, at least in regions. The channel longitudinal edges are formed at the transition from the channel-free regions 14 to the channels 12, or rather at the transition from the single layer to the two-layer fabric regions.

Within the scope of the invention, it was found surprisingly that in spite of the two layer woven fabric regions, it is possible to coat the backing fabric 6 with the polymer coating 3 without the polymer penetrating into the channels 12. This is surprising in particular because the two fabric layers 15a;b are less dense, in particular only half as dense, as the single layer fabric regions 14. This is because the two fabric layers 15a;b necessarily comprise less, in particular only half as much material as the single layer fabric regions 14. In the illustrated exemplary embodiment, the two fabric layers 15a;b each comprise only half as many warp and weft threads 7a,b; 8a, 8b as the single layer fabric regions 14. The density of the weft threads and the density of the warp threads of the two fabric layers 15a;b (in threads per centimeter) according to DIN EN 1049-2:1994-02 is accordingly half the density of the weft threads and the density of the warp threads of the single layer fabric regions 14.

Nonetheless, it was surprisingly possible to coat the backing fabric 6 such that the polymer coating 3 has a sufficient adhesion to the backing fabric 6, but still does not penetrate into the channels 12. Thus, the fabric top side 11a and the fabric bottom side 11b are also in the region of the fabric layers 15a;b or rather of the channels 12 sufficiently tight. Or rather, the fabric top side 11a and the fabric bottom side 11b form a closed surface also in the region of the fabric layers 15a;b. That means that the warp and weft threads 7a,b; 8a, 8b rest against each other, also in the region of the fabric layers 15a;b, no mesh is formed (in contrast to the schematic representation in FIGS. 1 and 2).

In this regard the coating takes place preferably in a known manner, preferably by means of a painting method, or calendaring, extrusion, mold pressing or injection molding.

Of course, the formation of the channels 12 according to the invention can also be attained by different types of binding and weaving techniques than as described based on the exemplary embodiment. According to the invention, the warp and weft threads 7a,b; 8a, 8b need to be woven together only such that from the same warp and weft threads 7a,b; 8a, 8b or rather from the same thread material, the single layer, channel-free fabric regions 14 and the two-layer fabric regions having the respective two single layer, not woven together fabric layers 15a; 15b are formed.

Basically, this can be achieved in a different manner, since a first part of the weft threads 8a; 8b is woven only with a first part of the warp threads 7a;b, and a second part of the weft threads 8a;b is woven only with a second part of the warp threads 7a; 7b. Or rather, the warp and weft threads 7a, b; 8a, 8b of the first fabric layer 15a are not woven with the warp and weft threads 7a, b; 8a, b of the second fabric layer 15b.

For example, the weft threads of the single layer fabric regions 14 in the two-layer fabric regions can also be divided into two, in particular equally thick, weft threads. The divided and undivided weft threads herein can each consist, for example, of numerous monofilaments, or the undivided weft threads can consist of two monofilaments and the divided weft threads consist of one monofilament. A first, divided weft thread or rather a first weft thread half, in this case is woven with the first warp thread 7a, and the second divided weft thread or rather the second weft thread half is woven with the second warp thread 7b. In this case, the warp thread density of the fabric layers 15a,b is likewise half as great as the warp thread density of the single layer fabric regions 14. But the density of the weft threads is the same, even if the weft threads are thinner.

In each of the described cases, the warp thread density of the fabric layers 15a,b is less than the warp thread density of the single layer fabric regions 14.

The mass per unit area according to DIN EN ISO 2286-2:1998-07 of the uncoated fabric layers 15a,b is in addition less than the mass per unit area of the uncoated, single layer fabric regions 14. The mass per unit area of the two fabric layers 15a,b need not be equal here. The uncoated backing fabric 6 preferably comprises a mass per unit area of 80 to 1200 g/m$^2$ according to DIN EN ISO 2286-2:1998-07.

In addition, it is possible within the scope of the invention to arrange other elements than the bellows frames 18a-c in the channels 12, such as lighting elements for example. In addition, towing ropes, in particular as tensioning elements, can also be disposed, at least in part, in the channels 12.

Another advantage of the invention is the simpler production, since no individual corrugations/pleats have to be manufactured from individual fabric sheets.

The bellows wall produced from the fabric according to the invention additionally has a high impermeability, since it is produced from one continuous material sheet.

In addition, the bellows wall has a more attractive design. Moreover, cleaning is very simple, because of the outer contour of the bellows wall being smooth and tracking with the vehicle.

Since the bellows frames for connection of the corrugations/pleats can be omitted, the weight reduction is enormous.

Referring particularly to FIG. 4, the crossway bellows 16 according to the invention preferably is used for a passageway 22 at which two vehicle parts 23a,b of a vehicle 24 are connected to be moved relative to each other, in particular in an articulated manner, in order to protect the passageway 22 against weather and draft air. The vehicle 24 preferably concerns an articulated bus 25 or a rail vehicle, in particular a passenger train, a tram, a metro or subway. The two vehicle parts 23a,b can rotate relative to each other, in particular about a vertical axis of rotation, and/or can be displaced relative to each other in the direction of travel and/or can be displaced transverse to the direction of travel and/or are rotary connected to each other about a longitudinal axis of the vehicle (wobble).

The crossway bellows 16 can further also concern a crossway bellows 16 for protection of the crossway of a flight passenger bridge or staircase to the aircraft and/or to the terminal.

Or it can concern a crossway bellows 16 for protection of the crossway between two building parts, for example, for protection of the crossway between a bridge and a section of the building.

In this regard, it is of course also within the scope of the invention, that the crossway bellows 16 is not formed as a single part, but rather consists of two bellows halves which are securely joined to each other, for example. Each of the bellows halves is formed to have a U-shaped cross section. Consequently, the two bellows halves each have two U-shaped tensioning frame elements, which respectively form a perimeter bellows tensioning frame 18a-c when in the assembled state. The formation of the crossway bellows 16 by means of two bellows halves is known per se and makes its assembly easier.

Similarly, the crossway bellows 16 can be formed from several, planar bellows elements (not depicted), which each comprise two straight tensioning frame elements, between which a sheet material 1 according to the invention is tensioned.

Also, the sheet material 1 can be used according to the invention as a wall for crossway elements which serve to protect a crossway between two machine parts or other components which can move relative to each other, in order to protect the respective crossway against external influences, in particular contamination, and to seal it against the environment. The crossway element herein can have different shapes, e.g. a flat shape or a U-shape or even the shape of a crossway bellows. In addition, the crossway element is securely joined to one of the two components, analogous to the crossway 22 of the two vehicle parts 23a,b.

Furthermore, the crossway element, in particular the crossway bellows 16, or rather its wall can also be formed to be uncorrugated and without pleats. In this case, the wall, in particular the bellows wall 19, is formed as being accordingly elastic. In particular, the wall is formed according to German patent application DE 10 2011 107 370 A1.

Preferably, the bellows wall 19 has the above-mentioned maximum tensile elongation pursuant to DIN EN ISO 13934-1:2013.

Furthermore, it is within the scope of the invention that the reinforcing member 2 is formed as being multi-layered and consists of a plurality of planar textile fabrics, which are each joined together by means of an adhesive layer made of a polymer. At least one of the textile fabrics is the backing fabric 6 according to the invention. However, it is preferred that the reinforcing member 2 consists of the backing fabric 6. In addition, an adhesive layer made of a polymer can be provided between the polymer coating 3 and the reinforcing member 2.

While the above description constitutes the preferred embodiment of the present invention, it will be appreciated that the invention is susceptible to modification, variation and change without departing from the proper scope and fair meaning of the accompanying claims.

What is claimed is:

1. Use of a multi-layered sheet material comprising the steps of
   providing the multi-layered sheet material,
   wherein the multi-layered sheet material comprises a reinforcing member, having a polymer coating at least on one side,
   wherein the reinforcing member comprises at least one backing fabric made of warp threads and weft threads,
   wherein the sheet material comprises at least one channel extending through the sheet material,
   wherein the warp threads and the weft threads are woven together such that the backing fabric comprises both a single layer fabric region and at least one at least two-layer fabric region having at least first and second fabric layers, which are not joined together, so that the channel is each formed between the first and second fabric layers,
   wherein, the first and second fabric layers each comprise the warp and the weft threads woven together, wherein the warp and the weft threads of the first fabric layer are not woven with the warp and the weft threads of the second fabric layer, and
   using the multi-layered sheet material as a bellows wall of a crossway bellows.

2. The use method according to claim 1 further comprising, all the warp and the weft threads in the single layer fabric region of the backing fabric are woven together.

3. The use method according to claim 1 further comprising, the first and second fabric layers are arranged as aligned to each other in a height direction of the sheet material.

4. The use method according to claim 1 further comprising, the density of the weft threads or the density of the warp threads of the first and second fabric layers in threads per centimeter according to DIN EN 1049-2:1994-02 is each less than the density of the weft threads or the density of the warp threads of the single layer fabric regions.

5. The use method according to claim 1 further comprising, the mass per unit area according to DIN EN ISO 2286-2:1998-07 of the first and second fabric layers is each less than the mass per unit area of the single layer fabric regions.

6. The use method according to claim 1 further comprising, the reinforcing member consists of the backing fabric.

7. The use method according to claim 1 further comprising, the sheet material has a maximum tensile elongation $\varepsilon_H$ according to DIN EN ISO 13934-1:2013 of ≥100% into the first surface direction or into the second surface direction.

8. The use method according to claim 1 further comprising, the channel extends at least regionally in a non-parallel manner to a warp direction of the backing fabric, or channel longitudinal edges delimiting the channel laterally are at least regionally not parallel to each other.

9. The use method according to claim 1 further comprising, the reinforcing member has the polymer coating on both sides.

10. The use method according to claim 1 further comprising, the crossway bellows is in the form of a corrugated or pleated bellows.

11. Use of a multi-layered sheet material comprising the steps of
providing the multi-layered sheet material,
wherein the multi-layered sheet material comprises a reinforcing member, having a polymer coating at least on one side,
wherein the reinforcing member comprises at least one backing fabric made of warp threads and weft threads,
wherein the sheet material comprises at least one channel extending through the sheet material,
wherein the warp threads and the weft threads are woven together such that the backing fabric comprises both a single layer fabric region and at least one at least two-layer fabric region having at least first and second fabric layers, which are not joined together, so that the channel is each formed between the first and second fabric layers,
wherein the warp and the weft threads of the first and second fabric layers each consist of divided or undivided warp and weft threads of the single layer fabric regions, and
using the multi-layered sheet material as a bellows wall of a crossway bellows.

12. A crossway element formed in a box-like or U-shaped cross sectional manner for protection of a passageway comprising two vehicle parts or components, which are connected together movably relative to each other, against external influences, wherein the crossway element comprises at least two tensioning elements being spaced apart from each other, and wherein the crossway element comprises a sheet material comprising a reinforcing member having a polymer coating at least on one side,
wherein the reinforcing member comprises at least one backing fabric made of warp threads and weft threads,
wherein the sheet material forms at least one channel extending through the sheet material,
wherein the warp and the weft threads are woven together such that the backing fabric comprises both a single layer fabric region and at least one at least two-layered fabric region having at least first and second fabric layers, which are not joined together, so that the channel is each formed between the first and second fabric layers,
wherein, the first and second fabric layers each comprise the warp and the weft threads woven together, wherein the warp and the weft threads of the first fabric layer are not woven with the warp and the weft threads of the second fabric layer, and
wherein the sheet material is stretched between the two tensioning elements, wherein the tensioning elements are each arranged in one of the channels.

13. The crossway element according to claim 12 further comprising, the crossway element is a crossway bellows, wherein the crossway bellows comprises at least two bellows supporting frames being spaced apart from each other and a bellows wall consisting of the multi-layered sheet material, and the bellows supporting frames are arranged in the channels.

14. The crossway element according to claim 13 further comprising, the bellows wall does not comprise corrugations or pleats, or the crossway bellows is formed as a corrugated or pleated bellows.

15. The crossway element according to claim 13 further comprising, the crossway bellows has a two-part design and consists of two bellows halves connected to each other, each having a U-shaped cross section.

16. A passageway for a vehicle comprising at least two vehicle parts connected together movably relative to each other at the passageway, or for a flight passenger bridge or staircase to an aircraft or to a terminal, or for a building connection comprising two building parts connected together at the passageway, the passageway further comprising, at least one crossway element protecting the passageway,
wherein the crossway element is formed in a box-like or U-shaped cross sectional manner for protection of the passageway,
wherein the crossway element comprises at least two tensioning elements being spaced apart from each other, and
wherein the crossway element comprises a sheet material comprising a reinforcing member having a polymer coating at least on one side, wherein the reinforcing member comprises at least one backing fabric made of warp threads and weft threads,
wherein the sheet material forms at least one channel extending through the sheet material, wherein the warp and the weft threads are woven together such that the backing fabric comprises both a single layer fabric region and at least one at least two-layered fabric region having at least first and second fabric layers, which are not joined together, so that the channel is each formed between the first and second fabric layers,
wherein, the first and second fabric layers each comprise the warp and the weft threads woven together, wherein the warp and the weft threads of the first fabric layer are not woven with the warp and the weft threads of the second fabric layer, and
wherein the sheet material is stretched between the two tensioning elements, wherein the tensioning elements are each arranged in one of the channels.

17. The passageway according to claim 16 further comprising, the vehicle is a rail vehicle or articulated bus.

* * * * *